(12) United States Patent
Southwell et al.

(10) Patent No.: US 12,077,712 B2
(45) Date of Patent: Sep. 3, 2024

(54) USING SILICA NANOPARTICLES TO REDUCE THE DEPOSITION OF SOLID SULFUR IN NATURAL GAS WELLS

(71) Applicant: NISSAN CHEMICAL AMERICA CORPORATION, Houston, IL (US)

(72) Inventors: John Edmond Southwell, Glen Ellyn, IL (US); Samuel James Maguire-Boyle, Spring, TX (US)

(73) Assignee: Nissan Chemical America Corporation, Houston, TX (US)

( * ) Notice: Subject to any disclaimer, the term of this patent is extended or adjusted under 35 U.S.C. 154(b) by 0 days.

(21) Appl. No.: 18/007,574

(22) PCT Filed: Jun. 1, 2021

(86) PCT No.: PCT/US2021/035214
§ 371 (c)(1),
(2) Date: Dec. 1, 2022

(87) PCT Pub. No.: WO2021/247546
PCT Pub. Date: Dec. 9, 2021

(65) Prior Publication Data
US 2023/0220269 A1    Jul. 13, 2023

Related U.S. Application Data

(60) Provisional application No. 63/033,555, filed on Jun. 2, 2020, provisional application No. 63/033,558, filed on Jun. 2, 2020, provisional application No. 63/067,719, filed on Aug. 19, 2020, provisional application No. 63/067,718, filed on Aug. 19, 2020, provisional application No. 63/067,715, filed on Aug. 19, 2020, provisional application No. 63/067,729, filed on Aug. 19, 2020, provisional application No. 63/067,703, filed on Aug. 19, 2020, provisional application No. 63/067,706, filed on Aug. 19, 2020.

(51) Int. Cl.
*E21B 43/34* (2006.01)
*C09K 8/532* (2006.01)

(52) U.S. Cl.
CPC .......... *C09K 8/532* (2013.01); *C09K 2208/10* (2013.01)

(58) Field of Classification Search
CPC ............................... E21B 43/34; C09K 8/532
USPC ....................................................... 166/304
See application file for complete search history.

(56) References Cited

U.S. PATENT DOCUMENTS

| | | |
|---|---|---|
| 3,331,657 A | 7/1967 | Peter et al. |
| 4,543,193 A | 9/1985 | Peter et al. |
| 4,728,447 A | 3/1988 | Labat |
| 10,472,556 B2 | 11/2019 | Hurtevent et al. |
| 11,059,079 B1* | 7/2021 | Allred, Jr. ............. C23G 5/032 |
| 11,077,474 B1 | 8/2021 | Allred, Jr. |
| 2016/0279595 A1 | 9/2016 | Tsapatsis |
| 2017/0349810 A1* | 12/2017 | Hurtevent ............. C09K 8/532 |
| 2018/0166681 A1* | 6/2018 | Archer ................ H01M 4/0416 |
| 2022/0220362 A1* | 7/2022 | Ohori ..................... E21B 43/16 |

FOREIGN PATENT DOCUMENTS

| | | |
|---|---|---|
| CN | 103214631 | 7/2013 |
| CN | 104449631 | 2/2016 |
| CN | 107857775 | 3/2018 |
| CN | 107488445 | 11/2019 |
| GB | 2 411 681 | 9/2005 |
| WO | WO2008/057783 A1 | 5/2008 |
| WO | WO2018/191144 A1 | 10/2018 |
| WO | 2019/199289 | 10/2019 |

OTHER PUBLICATIONS

International Search Report for PCT/US2021/035214, mailed Sep. 16, 2021, 3 pages.
Written Opinion for PCT/US2021/035214, mailed Sep. 16, 2021, 7 pages.
Esmaeil et al., "Challenges with elemental sulfur removal during the leaching of copper and zinc sulfides, and from the residues; a review", Hydrometallurgy, Jun. 7, 2017, pp. 333-343.
F Tari et al. "Modified and systematic synthesis of zinc oxide-silica composite nanoparticles with optimum surface area as a proper H 2 S sorbent," Canadian Journal of Chemical Engineering, vol. 95, No. 4, XP055484807, Apr. 2017, pp. 737-743.
ISR and Written Opinion issued Sep. 29, 2021 in PCT Application No. PCT/US2021/035224, 15 pages.
ISR and Written Opinion issued Sep. 29, 2021 in PCT Application No. PCT/US2021/035236, 14 pages.
ISR and Written Opinion issued Sep. 21, 2021 in PCT Application No. PCT/US2021/035243, 14 pages.
ISR and Written Opinion issued Sep. 15, 2021 in PCT Application No. PCT/US2021/035250, 13 pages.
ISR and Written Opinion issued Sep. 30, 2021 in PCT Application No. PCT/US2021/035252, 14 pages.
U.S. Appl. No. 18/007,646, filed Dec. 1, 2022, Southwell et al., related application.

\* cited by examiner

*Primary Examiner* — Zakiya W Bates
*Assistant Examiner* — Ashish K Varma
(74) *Attorney, Agent, or Firm* — Nixon & Vanderhye, PC

(57) ABSTRACT

A method to reduce the deposition of solid sulfur ($S_{8(s)}$) in a natural gas producing well is described where hydrophobic surface modified silica nanoparticles are added into the tubing string, and the hydrophobic surface modified silica nanoparticles interact with the gaseous sulfur ($S_{8(g)}$) present in the gas resulting in the reduction of the deposition of solid sulfur ($S_{8(s)}$), The hydrophobic surface modified silica nanoparticles are selected from the group that includes silica, alumina and silica-aluminate. The hydrophobic surface modified silica nanoparticles may be added to the tubing string either dry or mixed first into a carrier fluid, which carrier fluid may be a liquid or a gas.

12 Claims, No Drawings

USING SILICA NANOPARTICLES TO REDUCE THE DEPOSITION OF SOLID SULFUR IN NATURAL GAS WELLS

CROSS REFERENCE TO RELATED APPLICATIONS

This application is the U.S. national phase of International Application No. PCT/US2021/035214 filed Jun. 1, 2021, which designated the U.S. and claims the benefit of priority to U.S. Provisional Application No. 63/033,555, filed Jun. 2, 2020, U.S. Provisional Application No. 63/033,558, filed Jun. 2, 2020, U.S. Provisional Application No. 63/067,703, filed Aug. 19, 2020, U.S. Provisional Application No. 63/067,706, filed Aug. 19, 2020, U.S. Provisional Application No. 63/067,715, filed Aug. 19, 2020, U.S. Provisional Application No. 63/067,718, filed Aug. 19, 2020, U.S. Provisional Application No. 63/067,719, filed Aug. 19, 2020, and U.S. Provisional Application No. 63/067,729, filed Aug. 19, 2020, the entire contents of each of which are incorporated herein by reference.

FIELD OF THE INVENTION

This invention is in the field of methods to reduce deposition of solid sulfur in natural gas wells.

BACKGROUND OF THE INVENTION

Helium is a chemical element with the symbol He and atomic number 2. It is a colorless, odorless, tasteless, non-toxic, inert, monatomic gas, the first in the noble gas group in the periodic table. Its boiling point is the lowest among all the elements.

Helium is critically important for specialized uses in industrial, scientific and medical processes and procedures. Liquid helium is used in cryogenics (its largest single use, absorbing about a quarter of production), particularly in the cooling of superconducting magnets, with the main commercial application being in MRI scanners. Helium's other industrial uses—as a pressurizing and purge gas, as a cooling gas used in the manufacture of optical fibers, as a protective atmosphere for arc welding and in processes such as growing crystals to make silicon wafers, account for approximately half of the gas produced. A well-known but minor use is as a lifting gas in balloons and airships.

From the beginning of recovery of helium from underground sources, all commercial helium is recovered from natural gas fields. The range of Helium found in natural gas fields is anywhere from a barely detectable level of about 0.1% to a level of about 10% of natural gas in some fields. A helium content of about 0.3% or more is considered necessary for commercial helium extraction.

In the oil and gas industry, wet gas is often used to describe the raw unprocessed gas, but some gas is 'wetter' than others. Wet gas has higher levels of natural gas liquids (NGLs) and condensates. In a typical natural gas well, in addition to natural gas liquids, there are multiple types of gasses present, such as, but not limited to carbon dioxide ($CO_2$), methane ($CH_4$), nitrogen ($N_2$), hydrogen sulfide ($H_2S$), sulfur ($S_8$) and Helium (He).

If there is a significant amount of butane, ethane, pentane, liquid petroleum/gasoline or other higher hydrocarbons then the gas is termed 'wet'. These are NGLs or condensates. From the standpoint of BTUs, dry gas is below 1050. Wet gas is above 1050 BTUs with anything over 1350 being termed as 'super rich'.

When there is a high level of methane, the gas is considered dry, even if it has just been extracted from the well. Many conventional wells naturally produce dry gas that needs little processing. When we refer to dry gas, we mainly mean methane, which is used to heat homes, cook, and power some vehicles.

The gases in a natural gas well travel upwards from the reservoir to the surface through a series of connected pipes commonly referred to as the "tubing string".

As the gas rises from the reservoir and travels towards the surface through the tubing string it is a common occurrence that at the point along the wellbore where the temperature and pressure drop in the tubing string, gaseous sulfur ($S_{8(g)}$) begins to precipitate out into solid octasulfur ($S_{8(s)}$). This octasulfur then attaches itself to the inner surface of the pipe and is visible as a yellow solid. Eventually the yellow solid builds up on the pipe surface to a point where the flow of gas through the pipe is impeded causing the production of gas at the well to decrease. With a decrease in gas production comes a decrease in helium production and many times helium is the most valuable gas recovered from the well.

The problem of deposition of solid sulfur on the surfaces of pipes used to harvest natural gas is well known in the industry.

UK Patent Application No. 2411681A, "Method of Reducing Deposition of Elemental Sulfur in a Gas Well", published on Sep. 7, 2005. This patent application describes and claims a method of reducing elemental sulfur deposition in a gas well involves injecting an aqueous solution of a surfactant having a hydrophile-lipophile balance value of at least 8 into the gas well upstream of a location where elemental sulfur precipitates from the produced natural gas. The concentration of the surfactant is such that the solution is above the critical micelle concentration for the aqueous surfactant solution under the thermodynamic conditions prevailing in the wellbore. At least a portion of the precipitated sulfur dissolves in the aqueous surfactant solution.

U.S. Pat. No. 3,331,657, "Method of Preventing the Depositing of Sulfur in the Riser Pipes in Producing Natural Gases Laden with Hydrogen Sulfide and Containing Elemental Sulfur Solution, issued on Jul. 18, 1967. This patent describes and claims in a method of preventing the formation of solid sulfur in a stream of natural gas during upward passage of the same from a subterranean natural gas deposit, said natural gas including $H_2S$, $CO_2$ and elementary sulfur and being initially at an elevated pressure and temperature sufficiently high to maintain said sulfur in solution in said $H_2S$, the step of introducing into said stream of natural gas during upward passage of the same, at a point at which the pressure and temperature of said natural gas stream are still sufficiently high to maintain said sulfur in solution in said $H_2S$, an aqueous solution of the hydroxide of at least one substance selected from the group consisting of alkali metals and ammonia so as to form an aqueous solution of the sulfide of said substance having said sulfur dissolved therein in the form of an alkali metal or ammonium polysulfide.

U.S. Pat. No. 3,393,733, issued Jul. 23, 1968 to Shell Oil Company and is entitled "Method of Producing Wells Without Plugging of Tubing String". This patent claims a method of preventing hydrate formation and sulfur plugging in tubing string of a production well which extends from ground level to an underground producing zone for the production of a sulfur-containing fluid from said Zone, said method comprising:

(a) flowing said sulfur-containing fluid from the producing Zone upwardly through said production tubing string; and, (b) injecting into said production tubing string, through an injection tubing string in communication with said production tubing string, at a point where sulfur and hydrate deposition in the tubing string tend to form due to temperature and pressure drop in the tubing string, a hot sulfur-free fluid miscible with sulfur, said fluid being at a temperature above about 100° F. (37.8° C.) and at a pressure sufficient to prevent sulfur precipitation and solidification on the tubing string wall.

U.S. Pat. No. 4,543,193, is entitled "Process for Preventing the Precipitation of Elementary Sulphur in Riser Pipes of Probes for Natural Gas" and issued on Sep. 24, 1983. This patent describes and claims a process for preventing the precipitation of elementary sulfur from natural gas which may contain hydrogen sulfide and/or carbonic acid together with elementary sulfur during the mining of the gas which comprises dissolving the sulfur in a solvent which is selected from the group consisting of esters of mono- or poly-unsaturated fatty acids; thioethers of said esters or mono- or poly-unsaturated fatty acids; the mixed reaction products of hydrogen sulfide and said esters or mono- or poly-unsaturated fatty acids in the presence of elementary sulfur; and mixtures thereof, said solvent being optionally used in form of a solution wherein said solvent contains 10 to 24 carbon atoms in the fatty acid component and 1 to 22 carbon atoms in the alcohol component.

U.S. Pat. No. 10,472,556 "Nano-inhibitors", issued on Nov. 12, 2019. This patent describes and claims novel hybrid nanoparticles, useful for inhibiting or slowing down the formation of sulfur deposits or minerals in a well during the extraction of gas or oil. Specifically, the nanoparticles each include (i) a polyorganosiloxane (POS) matrix; and, optionally as a coating over a lanthanide oxide core, (iii) at least one polymeric scale inhibitor during the extraction of gas or oil. The invention also relates to the method for obtaining the nano-inhibitors and the application of same.

Previous attempts to reduce deposited octasulfur include trying to pump solvents into the production well. These attempts have not been successful. It has been found that as the solvents are introduced to the wellbore, they evaporate into the gas stream before coming into contact with the sulfur precipitation area.

What is needed are methods to reduce the deposition of solid sulfur on the inner walls of the pipes used to harvest natural gas containing helium and other valuable gasses.

SUMMARY OF THE INVENTION

The first aspect of the instant claimed invention is a method to reduce the deposition of solid sulfur ($S_{8(s)}$) in a natural gas producing well, the method comprising the steps of a) Operating a natural gas production field comprising one or more natural gas production wells with each well containing a tubing string of connected pipes that allow gas to travel from a reservoir to the surface, b) Introducing hydrophobic surface modified silica nanoparticles into the tubing string, c) Contacting the hydrophobic surface modified silica nanoparticles with the gaseous sulfur ($S_{8(g)}$) present in the gas resulting in an interaction that causes the reduction of the deposition of solid ($S_{8(s)}$), wherein said hydrophobic surface modified silica nanoparticles are selected from the group consisting of silica, alumina and silica-aluminate.

The second aspect of the instant claimed invention is the method of the first aspect of the invention wherein the hydrophobic surface modified silica nanoparticles are mixed with a carrier fluid and said carrier fluid may be liquid or gaseous or a mixture of liquid and gas.

The third aspect of the instant claimed invention is the method of the second aspect of the invention wherein the carrier fluid is liquid, and the liquid may be aqueous or non-aqueous.

The fourth aspect of the instant claimed invention is the method of the second aspect of the invention wherein the carrier fluid is aqueous.

The fifth aspect of the instant claimed invention is the method of the second aspect of the invention wherein the carrier fluid is gaseous, and the gaseous carrier fluid is selected from the group consisting of natural gas, liquefied natural gas (LNG), methane ($CH_4$), nitrogen ($N_2$), Helium (He) and mixtures thereof.

The sixth aspect of the instant claimed invention is the method of the second aspect of the invention wherein the carrier fluid is gaseous, and the gaseous carrier fluid is selected from the group consisting of carbon dioxide ($CO_2$) and mixtures thereof with other gases.

The seventh aspect of the instant claimed invention is the method of the first aspect of the invention wherein the hydrophobic surface modified silica nanoparticles comprise silica.

The eighth aspect of the instant claimed invention is the method of the first aspect of the invention wherein the hydrophobic surface modified silica nanoparticles comprise alumina.

The ninth aspect of the instant claimed invention is the method of the first aspect of the invention wherein the hydrophobic surface modified silica nanoparticles comprise silica aluminate.

The tenth aspect of the instant claimed invention is the method of the first aspect of the invention wherein the hydrophobic surface modified silica nanoparticles are added dry to the tubing string.

DETAILED DESCRIPTION OF THE INVENTION

Current methods for recovering Helium from natural gas are described in this review article, "A Review of Conventional and Emerging Process Technologies for the Recovery of Helium from Natural Gas", by Rufford, Chan, Huag and May, Adsorption Science and Technology, 2014, vol 31, pages 49-72. It is believed that the instant claimed invention will work in all three of the known recovery methods for extracting Helium: cryogenic distillation followed by pressure-swing adsorption, adsorption by itself and membrane technology.

As used herein, the term "nanoparticle" means a particle from about 1 to about 100 nanometers in diameter. In some embodiments, the term "nanoparticle" means a cluster of atoms or molecules with a radius of less than 100 nanometers. In some embodiments, the term nanoparticle is applied to inorganic materials, for example, silica. In some embodiments, the nanoparticles used herein are produced via the waterglass synthesis method.

As used herein, the term "silica" may refer to silica particles or a silica dispersion. As used herein, the term "silica" may refer to silica particles originating from colloidal silica or from fumed silica.

As used herein, the term "nanoparticles" can refer to both multiple individual nanoparticles as well as a population of nanoparticles of a particular type. Nanoparticles can also be referred to nanometer-sized particles, and nano powders are agglomerates of nanoparticles. In some embodiments, the term "nanofluid" means a base fluid, for example, water or oil, that comprises nanoparticles, including fluids with some or all of the nanoparticles in suspension.

The method requires hydrophobic surface modified silica nanoparticles. The hydrophobic surface functionalization allows wetting of the $S_8$ octasulfur in the gaseous or vapor phase onto the surface of the nanoparticle inhibiting its tendency to adhere to the wellbore walls. The size of the wetted particle allows it to be flowable in the gas stream to be carried to the well head for capture.

The wetting described above may also be augmented by a chemical reaction that the nanoparticle catalyzes when gaseous sulfur is converted to hydrogen disulfide.

Hydrophobic surface modified silica nanoparticles where the nanoparticles comprise silica, alumina and/or silica aluminate are available commercially from Nissan Chemical America Corporation
10333 Richmond Avenue, Suite 1100
Houston, TX 77042
www.nissanchem-usa.com under different names, including, but not limited to, the EnduraSol® and Endura™ branded products and the Organosilicasol™ branded products.

The nanoparticles may be added to the tubing string directly as a dry powder.

Or the nanoparticles may be added to the tubing string by first adding the nanoparticles to a carrier fluid and then adding the carrier fluid, with the nanoparticles in it, to the tubing string. The carrier fluid may be liquid or gaseous.

When the carrier fluid is liquid, the liquid may be aqueous or non-aqueous.

When the carrier fluid is gaseous the gas may be any gas that does not cause problematic reactions. In an embodiment the gas is selected from the group consisting of natural gas, liquefied natural gas (LNG), methane ($CH_4$), nitrogen ($N_2$), Helium (He) and mixtures thereof. In an embodiment the gas is carbon dioxide ($CO_2$) and mixtures thereof with other gases.

Dry nanoparticles comprising silica, alumina and/or silica aluminate are available commercially under different names, including, but not limited to, the EnduraSol® and Endura™ branded products and the Organosilicasol™ branded products.

A liquid carrier fluid containing hydrophobic surface modified silica nanoparticles where the nanoparticles comprise silica, alumina and/or silica aluminate are available commercially from Nissan Chemical America under the tradename nanoActiv®.

EXAMPLES

Example 1 (Comparative Example)

Solid Sulfur is put into a clear glass vessel. Elevated temperatures are applied until the solid sulfur melts into a liquid at approximately 239.38° F. (115.21° C.). After the sulfur has become a liquid, the temperature is gradually reduced until solid octasulfur deposits on the walls of the vessel. When the experiment is ended the octasulfur deposit remains on the walls and cannot be removed by tapping or shaking the vessel.

Example 2

Example 1 is repeated but in this example, hydrophobic silica powder, a dry hydrophobic silica nanoparticle, Endura™HSP 45 available from Nissan Chemical America, is put in the vessel before (2a), during (2b) and after (2c) the solid sulfur is put in the vessel. Then the temperature is gradually reduced.

In each of experiments 2a, 2b and 2c, with the reduction in temperature octasulfur is not observed to deposit on the walls of the glass. When each of experiments 2a, 2b and 2c are ended and the contents of the vessel poured out, a small quantity of nanoparticle enveloped solid sulfur is found and upon analysis the presence of solid sulfur in the center of the nanoparticle solid is confirmed.

Example 3

Example 1 is repeated but in this example, toluene, a carrier fluid, containing a silica nanoparticle surface treated with phenyltrimethoxysilane, a hydrophobic silica nanoparticle, is put in the vessel before (3a), during (3b) and after (3c) the solid sulfur is added and melted into liquid sulfur in the vessel at a temperature of about 116° F. (46.7° C.). Then the temperature is gradually reduced.

In each of experiments 3a, 3b and 3c, with the reduction in temperature, octasulfur is not observed to deposit on the walls of the glass. When each of experiments 3a, 3b and 3c are ended and the contents of the vessel poured out, a small quantity of nanoparticle enveloped solid sulfur is found and upon analysis the presence of solid sulfur in the center of the nanoparticle solid is confirmed.

What is claimed is:

1. A method to reduce the deposition of solid sulfur (S8(s)) in a natural gas producing well, the method comprising the steps of:
    a) operating a natural gas production field comprising one or more natural gas production wells with each well containing a tubing string of connected pipes that allow gas to travel from a reservoir to the surface,
    b) introducing hydrophobic surface modified silica nanoparticles into the tubing string, wherein the hydrophobic surface modified silica nanoparticles are surface treated with phenyltrimethoxysilane, and
    c) contacting the hydrophobic surface modified silica nanoparticles with a gaseous sulfur ($S8_{(g)}$) present in the gas resulting in an interaction that causes the reduction of the deposition of solid sulfur (S8(s)).

2. The method of claim 1 where the hydrophobic surface modified silica nanoparticles are mixed with a carrier fluid and said carrier fluid is liquid or gaseous or a mixture of liquid and gas.

3. The method of claim 2 where the carrier fluid is liquid, and the liquid is aqueous or non-aqueous.

4. The method of claim 2 where the carrier fluid is aqueous.

5. The method of claim 2 where the carrier fluid is gaseous and the gaseous carrier fluid is selected from the group consisting of natural gas, carbon dioxide ($CO_2$), methane ($CH_4$), nitrogen ($N_2$), Helium (He) and mixtures thereof.

6. The method of claim 2 where the carrier fluid is gaseous and the gaseous carrier fluid is selected from the group consisting of carbon dioxide ($CO_2$) and mixtures thereof with other gases.

7. The method of claim 1 where the hydrophobic surface modified silica nanoparticles comprise alumina.

8. The method of claim 1 where the hydrophobic surface modified silica nanoparticles comprise silica aluminate.

9. The method of claim 1 where the hydrophobic surface modified silica nanoparticles are added dry to the tubing string.

10. A method to reduce the deposition of solid sulfur ($S8_{(s)}$) in a natural gas producing well, the method comprising the steps of:
  a) operating a natural gas production field comprising one or more natural gas production wells with each well containing a tubing string of connected pipes that allow gas to travel from a reservoir to the surface,
  b) introducing hydrophobic surface modified silica nanoparticles into the tubing string, wherein the hydrophobic surface modified silica nanoparticles are surface treated with phenyltrimethoxysilane and mixed with a gaseous carrier fluid, and
  c) contacting the hydrophobic surface modified silica nanoparticles with a gaseous sulfur ($S8_{(g)}$) present in the gas resulting in an interaction that causes the reduction of the deposition of solid sulfur ($S8_{(s)}$).

11. The method of claim 10 where the hydrophobic surface modified silica nanoparticles comprise alumina.

12. The method of claim 10 where the hydrophobic surface modified silica nanoparticles comprise silica aluminate.

* * * * *